May 23, 1961 E. VON KOENIG 2,985,764
VARIABLE INTERVAL TIMER
Filed May 11, 1959 3 Sheets-Sheet 1

INVENTOR.
EMANUEL von KOENIG
BY Reif and Gregory
ATTORNEYS

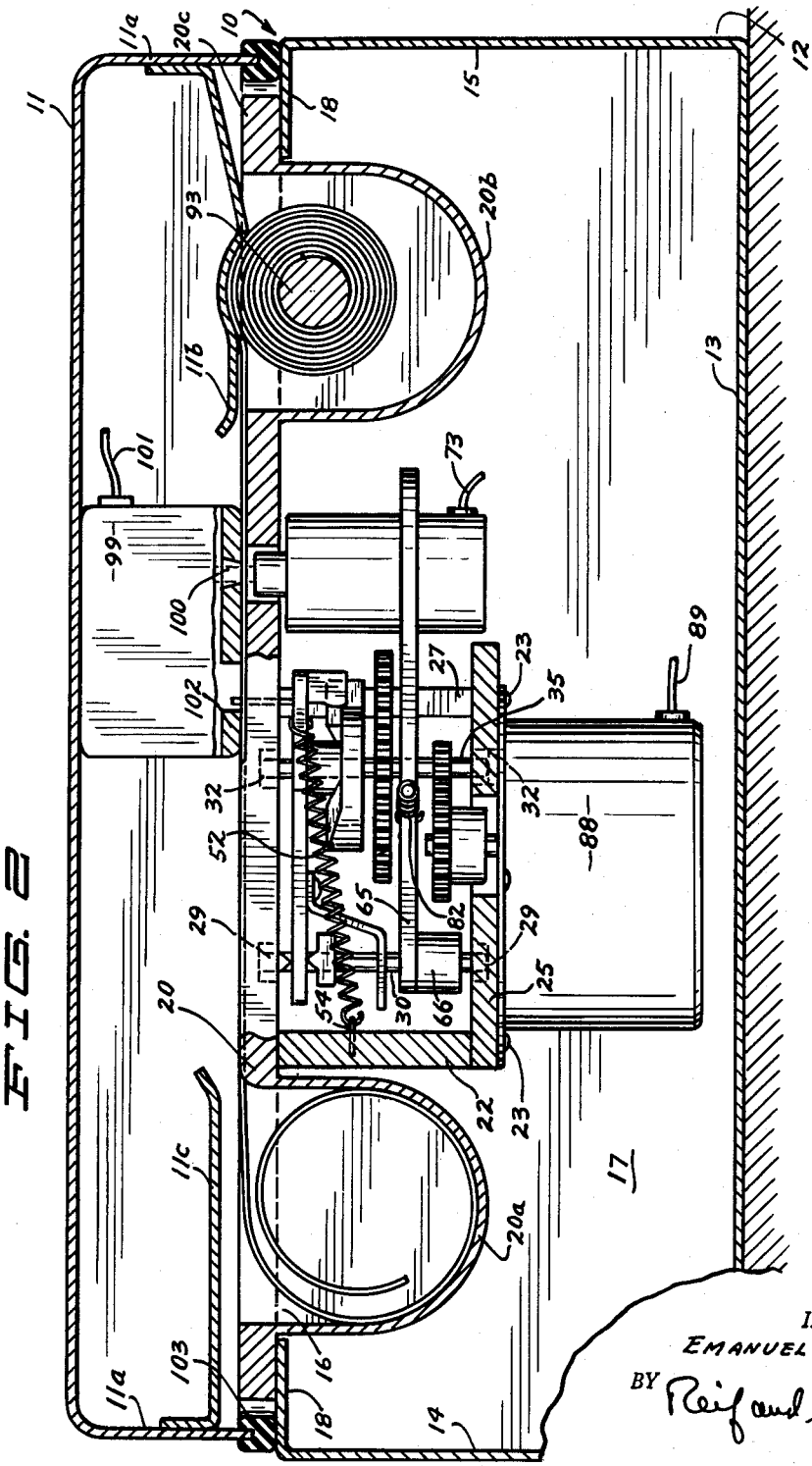

May 23, 1961 E. VON KOENIG 2,985,764
VARIABLE INTERVAL TIMER
Filed May 11, 1959 3 Sheets-Sheet 3
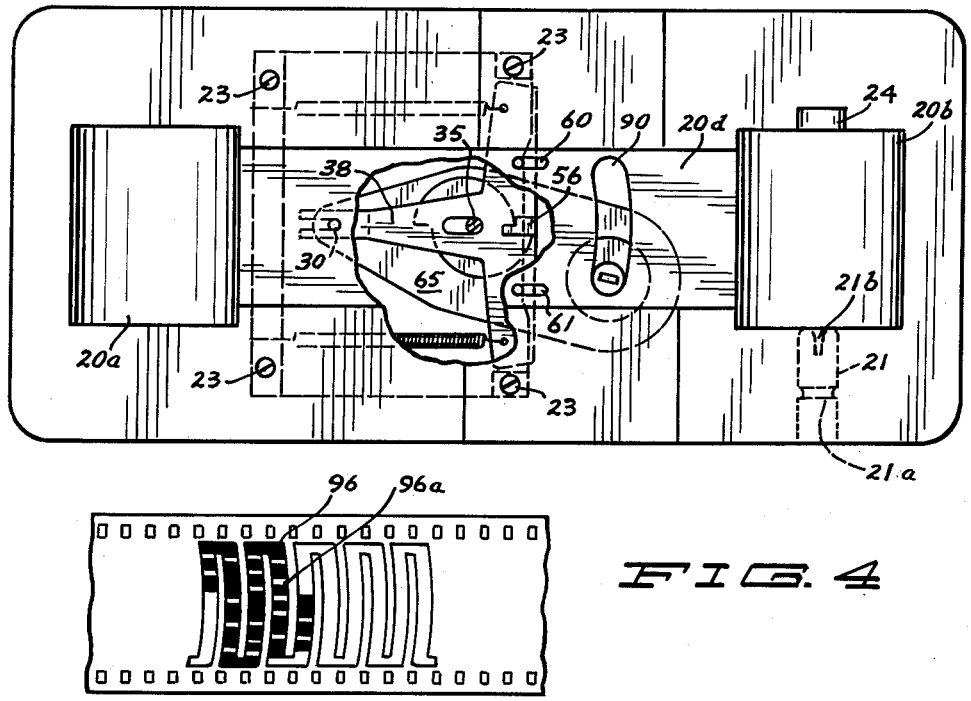
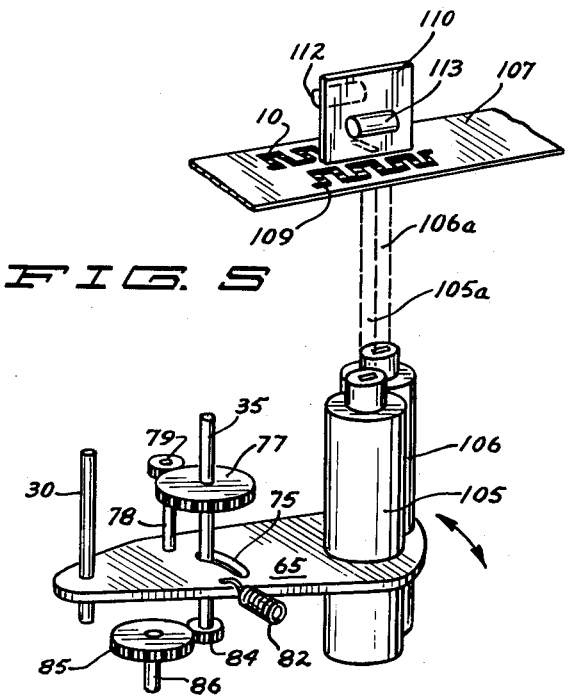
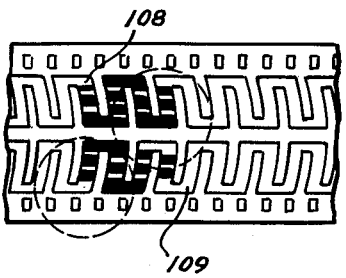
INVENTOR.
EMANUEL VON KOENIG
BY Reif and Gregory
ATTORNEYS

United States Patent Office 2,985,764
Patented May 23, 1961

2,985,764
VARIABLE INTERVAL TIMER
Emanuel von Koenig, 1200 Laurel Ave., St. Paul, Minn.
Filed May 11, 1959, Ser. No. 812,538
10 Claims. (Cl. 250—219)

This invention relates to a variable timing device, with particular reference being made here to its use in connection with a slide changing device for a slide projector, as in the use of 35 mm. slides or transparencies. Commonly used automatic slide changers are actuated to change the slides in the projector at certain fixed regular intervals. It is desirable to have said slides changed automatically at certain irregular intervals. The variances in the intervals for changing the slides are synchronized with a recorded commentary to accompany the showing of said slides.

In showing a series of slides regarding any desired subject matter, comments of varying length are generally made in regard to various of the slides. It is desirable to have some means for programing in advance the various time intervals which will be required for comments in connection with the slides. It is desirable to use such a means for determining the intervals at which slides will be changed as they are shown.

It is also desirable to have such a variable timing device as indicated above which may be utilized for actuating one or more pieces of work at the same time intervals or at certain different time intervals.

It is an object of this invention to provide a variable timing device such as may be adapted to actuate a slide changing mechanism at variable intervals and more specifically at certain predetermined irregular intervals.

It is another object of this invention to provide a device in connection with a film strip normally impervious to the passage of light therethrough but having certain spaced light conductive spots or areas through which a beam of light may be projected, which is adapted to advance said film strip and scan the same with a beam of light whereby the passage of said light through each of said light conductive areas or spots actuates a photo electric cell mounted over said film strip and adapted to actuate a slide changing mechanism.

It is a further object of this invention to provide a device having a film strip in connection therewith with said film srip having spaced areas therein for the passage of light therethrough, which device comprises means normally being urged in a direction to advance said film strip, means for periodically causing engagement between said means and said film strip for advancing said film strip, said second means being adapted to oscillate a light beam in connection therewith for scanning said film strip.

It is a more specific object of this invention to provide a variable timing device having a film strip in connection therewith with said film strip having certain areas therein for light to pass therethrough and a photo electric cell mounted above said film strip, said device having in combination, a member for advancing said film strip supported in a position adjacent said film strip and normally out of engagement therewith with means for constantly urging said member in a direction to advance said film strip, a cam mounted adjacent said member adapted to engage and periodically move said member a certain distance in a direction opposite the direction in which it is normally urged and raise the same into engagement with said film strip for the advance of said film strip for a certain distance, a second member having mounted thereon a light source having a beam of light directed at said film strip, means for rotating said cam and oscillating said light source simultaneously in a specific relation one to the other whereby said light beam scans said film strip with light from said light beam passing through said certain areas in said film strip to actuate said photo electric cell.

It is also an object of this invention in connection with the previous object to have a plurality of light cells mounted in specific relation one to the other, each being adapted to scan specific portions of said film strip for respectively actuating photo electric cells mounted above said film strip and adapted to operate pieces of work whereby a plurality of pieces of work may be operated by means of applicant's device.

These and other objects and advantages of the invention will be fully set forth in the following description made in connection with the accompanying drawings in which like reference characters refer to similar parts throughout the several views and in which:

Fig. 2 is a view in central longitudinal vertical section;

Fig. 3 is a top plan view of applicant's device on a reduced scale with a portion thereof broken away and other portions thereof shown in dotted line;

Fig. 4 is a fragmentary plan view of a film strip showing a scanning pattern thereon;

Fig. 5 is a portion of applicant's device in perspective on a reduced scale showing a modification of a portion thereof; and Fig. 6 is a fragmentary plan view of a modified film strip showing a scanning pattern thereon.

Figure 1:
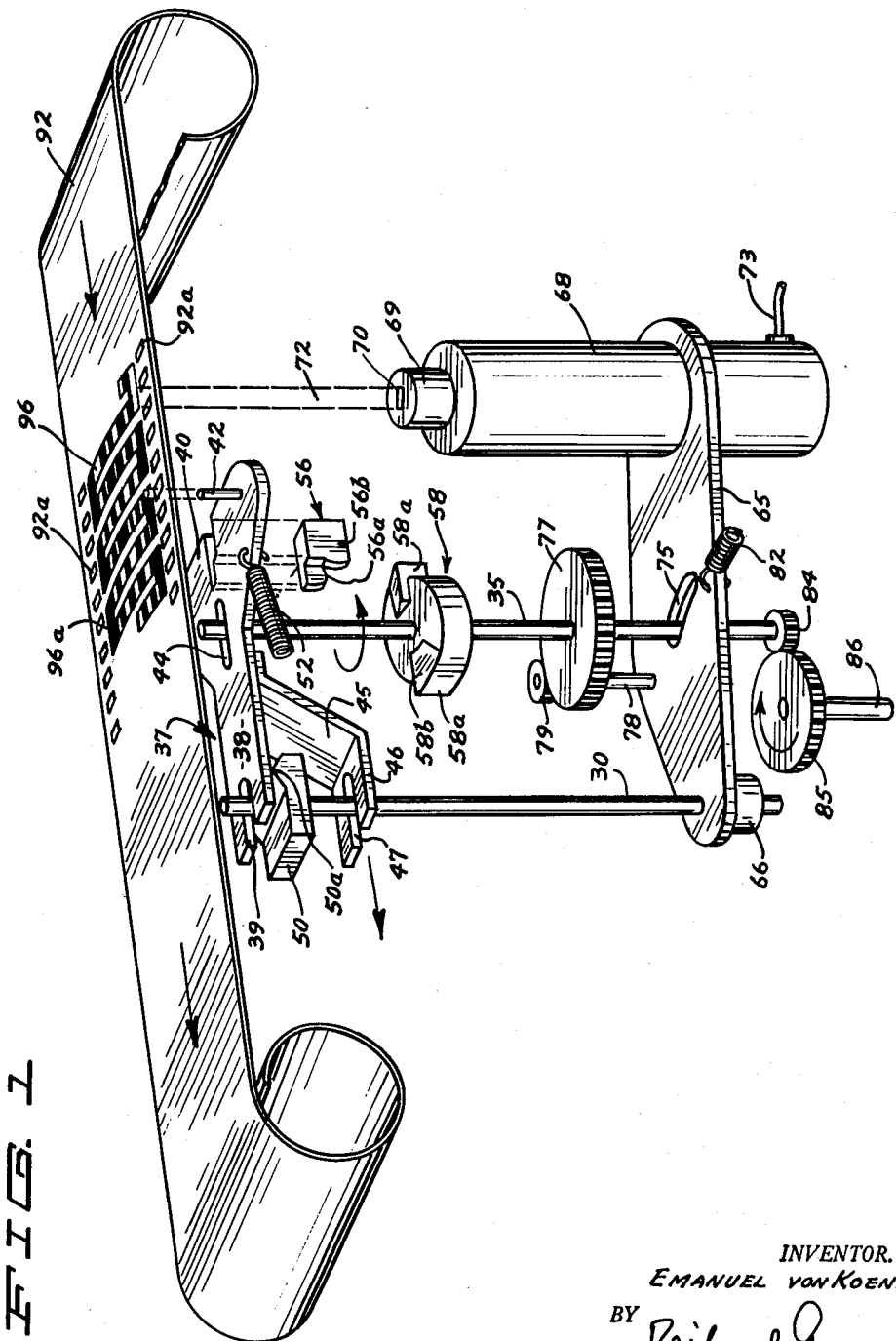
Fig. 1 is a perspective skeleton view showing the essential operating elements of the applicant's device.

Referring to the drawings, like reference characters refer to identical parts throughout the several views. A casing 10 parallelepiped in form is provided having a base portion 12 and a cover portion 11. Said casing may be formed of any suitable light impervious material. Said base portion 12 comprises a bottom 13, ends 14 and 15, and a top 16. Only one side 17 is here shown. Said top 16 is substantially open with the exception of an annular rim 18 extending inwardly from the sides and ends of said base portion with portions thereof shown extending inwardly from the ends 14 and 15 in Fig. 2.

Overlying said open side 16 and supported on said rim 18 is a carrier plate member 20 formed of substantially rigid sheet material. Said plate member 20 is here formed to be rectangular in plan, as indicated in Fig. 3. Adjacent either end of said plate member 20 and centrally thereof as indicated in Fig. 2, there are formed end enclosed depending pockets 20a and 20b here shown as being substantially U-shaped in form and extending transversely of said carrier plate. At either end of said pocket 20b respectively are a sleeve 24 and a common type crank pin 21 for engaging a film spool at either end thereof to support the same. Said pin 21 will be movable towards and away from said sleeve 24 for use. Said pin 21 is shown having an annular groove 21a adapted to be engaged by a common type locking member not here shown and having a slot 21b formed on the inner end thereof.

Said pockets 20a and 20b are shown spaced inwardly from either end of said carrier plate 20 to snugly fit within said rim 18. Extending about said carrier plate 20 is a flange portion 20c adapted to rest on said rim 18. Formed centrally in said carrier plate 20 and extending between pockets 20a and 20b is a channel 20d of a width and depth sufficient to accommodate a film strip therein. In practice it has been found that a depth of 1/32 of an inch is adequate for this purpose. Depending from said carrier plate 20 adjacent the inner side of pocket 20a is a vertical wall 22 secured to said carrier plate 20 by transversely spaced metal screws 23. Extending at right angles to said wall 22 in the direction of pocket 20b and secured to said wall 22 by screws 23 is a supporting plate 25. A pair of transversely spaced vertically extending posts 27 are disposed between the free end of said plate 25 and carrier plate 20 to act as supporting members and having their respective ends secured to said plate 25 and carrier plate 20 by screws 23.

Journaled substantially centrally vertically between said plate 25 and carrier plate 20 in bearings 29 spaced inwardly somewhat from said wall 22 is a shaft 30. Longitudinally spaced from said shaft 30 in alignment therewith and journaled between said plate 25 and carrier plate 20 and having its ends journaled in bearings 32 is a shaft 35. Operatively mounted adjacent the upper ends of said shafts 30 and 35 is a film advancing plate member 37 having an elongated body portion 38 having a longitudinally extending slot 39 formed in one end thereof and having a wing-shaped portion 40 formed at its other end. Said wing-shaped portion has upstanding therefrom a pair of transversely spaced prongs 42. Said prongs may be variously formed and are here shown to be cylindrical. Said member 37 has a longitudinally extending slot 44 adjacent said wing-shaped portion 40 to accommodate the shaft 35 extending therethrough and permitting longitudinal movement of said plate member 37 in relation to said shaft. A depending offset portion 45 is secured at its upper end to said body portion 38 and has a lower free end portion 46 parallel to the slotted end of body portion 38 and having a longitudinally extending slot 47 therein in vertical alignment with said slot 39. A collar 50 is secured to said shaft 30 to support the slotted end of body portion 38 adjacent the upper end of said shaft 30. Said member 37 is positioned to be parallel to said carrier plate 20. Said collar 50 may be variously formed. It is here shown as being substantially parallelepiped in form and having an angular raised portion 50a which provides an edge portion for supporting said plate 37 and providing a pivot therefor. A pair of coiled springs 52 inclined downwardly to the left, as viewed in Figs. 1 and 2, are secured respectively at one end to adjacent the outer ends of said wing portion 40 by having terminal hook portions extending through apertures in said wing portion as indicated in Fig. 1, and having their other ends secured to wall 22 by hooks 54.

Said shaft 30 is disposed through said slots 39 and 47. It is seen that springs 52 will tend to urge said plate 37 in a direction towards said shaft 30 and to urge the wing portion of said plate in a downwardly direction. Depending from the wing portion 40 centrally thereof is a cam follower 56. Said cam follower 56 may be variously formed and is here indicated as being substantially L-shaped in plan having a forwardly extending leg portion 56a. Said cam follower is also formed to be L-shaped in transverse vertical section with a depending leg portion 56b. Thus it is seen that portion 56a extends forwardly of portion 56b, and portion 56b extends downwardly below said portion 56a. Said portions 56a and 56b are thus offset from one another both in horizontal and vertical directions.

Mounted on shaft 35 at a height thereon for operative engagement with said cam follower 56 is a dimensional cam 58. Said cam 58 is shown to have a substantially cylindrical body portion. Said cam is formed to have a pair of diametrically opposed projecting peripheral portions 58a extending outwardly tangentially and terminating in vertical radially extending planes. Said portions 58a have inclined surfaces 58b, as indicated in Fig. 1. Said cam 58 will be rotated in a counter-clockwise direction. Said cam follower 56 will be in contact with said cam 58 due to the action of springs 52. In its operational relationship with cam follower 56 to move the same, the outer surface of said cam 58 will first engage the portion 56b with the projections 58a in turn moving said cam follower in a direction opposite that in which it is normally urged, and the portion 56a will be raised in turn by the upwardly inclined surfaces 58b and thus said prongs 42 will be raised upwardly to extend through elongated slots 60 and 61 provided in said carrier plate 20. While one of the inclined surfaces 58b is elevating the portion 56a, the portion 56b will have moved to the end of the adjacent projecting portion 58a and will abruptly move inwardly the depth of said projection, which depth determines the distance which plate 37 will be urged in the direction of said shaft 30. Said plate 37 is still held in an elevated position by the inclined surface 58b. When the portion 56a moves beyond the end of the upwardly inclined surface 58a, the end 40 of plate 37 will drop and plate 37 will tilt downwardly lowering the prongs 42 below the plane of said carrier plate 20 whereby said prongs 42 will be withdrawn from said slots 60 and 61. Thus the pairs of portions 58a and 58b in turn respectively engage the cam follower 56.

Only one form of a dimensional cam 58 and a follower 56 are here described. These may be otherwise formed to have a similar operational engagement.

A plate member 65 of elongated and somewhat irregular form is pivoted at one end to said shaft 30 and is supported on said shaft by a collar 66. Said plate member has mounted in the other end thereof a light housing 68 here indicated as being substantially cylindrical in form and having an upper end portion 69 of reduced dimension with a slit 70 therein through which a beam of light 72 is projected. Said light housing 68 is of common construction having a light source therein and will be connected to a source of electrical energy by a conduit 73. Shaft 35 extends through a somewhat arcuate slot 75 formed in said plate 65. Mounted on said shaft 35 somewhat above said plate 65 is a cam 77. Journaled on the upper end of a shaft 78 upstanding from said plate 65 is a cam follower 79 adapted to be engaged by said cam 77. Though no specific form is indicated here for said cam 77, it will preferably be shaped substantially ovate in plan to oscillate said light housing 68, as will hereinafter be indicated. A spring 82 will connect said plate 65 to an adjacent side of said base portion 12 to urge said plate 65 in a direction opposite that which said plate 65 is moved by the action of said cam 77. A toothed gear 84 is secured to said shaft 35 some distance below said plate 65 and is adapted to be engaged and rotated by a mating gear 85 secured to a driveshaft 86 upstanding from a motor 88 which is mounted on and secured to the bottom of said supporting plate member 25. Said motor will be connected to a source of current by a conduit 89.

An arcuate slot 90 is formed in said carrier plate 20 through which the beam of light 72 from said light housing 68 will be directed. A roll of film 92 is used in connection with the applicant's device. A spool 93 on which said film is normally carried will be disposed into pocket 20b and rotatingly held therein by the sleeve 24 and pin 21. The free end of said film will be moved across the channel 20d and dropped freely into the pocket 20a. As said film is advanced, it will tend to be self winding in the pocket 20a. Applicant's device in the embodiment here disclosed is adapted to utilize regular 35 mm. film having perforations 92a in transverse alignment along the edges thereof. Said slots 60 and 61 are positioned to be in vertical alignment with the perforations 92a passing thereover, and the prongs 42 when raised upwardly through said slots 60 and 61 will be disposed through transverse pairs of said perforations 92a for operational engagement with said film.

Said film 92 is programmed in advance for use in connection with the applicant's device. Said film will be mounted in a device which is no part of the present invention disclosed and claimed herein and said film will be exposed in connection with work to be done, such as the showing of a series of 35 mm. slides. A commentary will be recorded in connection with the showing of the slides. Said film 92 will be exposed as said commentary is being recorded. Said film will be exposed in such a manner that a track 96 will be formed, as indicated in Fig. 4, hereinafter referred to as a scanning track. At each interval at which it is desired to change a slide, the opening through which said film is being exposed will be closed so that in specific spots or areas 96a the film will not be exposed. These areas 96a will be spaced in accordance with the intervals at which it is desired to change slides. When the film is developed the exposed scanning track will be black and will thus be light impervious. The unexposed areas 96a on the film after the film is developed will be clear areas through which light can readily pass. Said film is scanned along track 96 by light 72 when the same is oscillated and said light will pass through said light areas 96a in said film.

Mounted on said carrier plate 20 is a photo electric cell housing 99 having a photo electric cell 100 therein overlying the arcuate slot 90 through which said film 92 is scanned by light beam 72. The housing 99 and the mechanism therein as to its specific form is no part of the invention here disclosed. Said housing is indicated as being of a common and well known type and will be connected to a source of energy by a conduit 101. Said housing 99 is supported on a block type base portion 102 adapted to overlie the channel 20d and serves to hold film 92 within said channel as said film is being advanced.

Said cover portion 11 having depending sides and ends 11a is adapted to overlie the top of said base portion 12 and has formed around its lower edge portion into which it is secured a resilient bead-like portion 103 adapted to frictionally engage said base portion 12 and support said cover 11 on said rim 18 and prevent the passage of light therebetween. Extending inwardly and somewhat downwardly from an end portion 11a of said cover 11 to overlie and resiliently bear against the portion of said film 92 on spool 93 is a spring-like finger 11b having a concave portion overlying said spool. Extending inwardly from the opposite end of said cover 11 is a horizontally extending finger 11c overlying the pocket 20a to tend to guide said film 92 to have it wind up and be fully contained within said pocket 20a.

In operation, film 92 having been previously prepared as described above will be mounted on said carrier plate 20 with a free end of said film having been moved through channel 20d and disposed into pocket 20a. Said film will be positioned so that the beginning of the scanning track 96 will be coordinated with the recorded commentary. The motor 88 will be energized to rotate shaft 35 at a desired number of r.p.m.'s. The operator will control this in connection with the speed with which he will wish the film strip 92 to advance. Thus shaft 35 will be rotated by means of the driving gear 85 and the driven gear 84. With the rotation of said shaft 35 it is seen that cam 77 will move the follower 79 to oscillate plate 65 and light housing 68 to scan the film strip 92 with the light beam 72 through the slot 90.

The plate 37 is normally in a position below the carrier plate 20 and out of contact with the film strip 92. The springs 52 will normally urge the plate 37 in a direction to advance the film strip 92. With the cam follower 56 in its forward position under the tension of springs 52, it will be engaged by the dimensional cam 58. Said cam is here adapted to rotate in a counterclockwise direction. Said cam 58 comes into engagement with said cam follower 56 as previously described. As the projections 58a and 58b of said cam move said follower 56 in a direction away from said shaft 30, said plate 37 is tilted upwardly and the prongs 42 are moved upwardly and projected through the slots 60 and 61 at the point to which the follower 56 is moved the furthest by same cam 58. Said prongs in being projected upwardly through said slots 60 and 61 also extend through a pair of transverse slots or perforations 92a of said film strip 92. When the portion 56b comes to the end of the projection 58a it is moved abruptly inwardly by springs 52 the distance to the central body portion of the cam 58. Thus the plate member 37 is moved forwardly and the film strip 92 is advanced. The portion 56a is still riding upwardly on the inclined surface 58b and at the end of this surface it will drop down sharply as the tendency of said springs 52 will be to urge plate 37 downwardly at the end portion 40. This then will be the extent of the forward advance of said film strip 92. This operation is repeated. The forward advance of the film strip determines the extent of the spacing between the scanning tracks extending transversely of the film strip. These may be spaced as may be desired but will be adapted to overlie the slot 90. Thus the light beam 72 will follow the scanning track present on said film strip 92. Through each of the clear areas 96a the light beam 72 will pass to actuate the photo electric cell 100. The photo electric cell 100 will be operationally connected to a piece of work, such as a slide changing mechanism, which may be at a remote distance from the device herein disclosed. The photo electric cell will be actuated to operate said work piece at the intervals at which said light areas 96a are spaced on the scanning track 96.

The intervals at which said cam 58 engage the cam follower 56, the extent that said cam moves said follower 56 and plate 37, and the specific formation of the scanning track 96, may be varied according to the wishes of the operator. The applicant has found it desirable to establish a relationship whereby the shaft 35 rotates at three r.p.m.'s and the film strip is advanced at intervals of 3/16 of an inch at ten second intervals with ten seconds being required for the light beam 72 to travel each path transversely of the film strip 92. Thus it is seen that applicant's device is adapted for a rather slow action. With the use of a scanning track transversely of a film strip instead of using one longitudinally thereof, it is seen that there is an efficient utilization of the film strip and that only a relatively short length will be required for the showing of a relatively large number of slides. The speed of the scanning beam and the distance of forward movement of said film strip may be varied as desired.

With reference to Figs. 5 and 6, a modification of a portion of applicant's device is shown in which all portions are identical in construction and bear the same reference characters as portions previously described. Mounted in plate 65 are a pair of light housing members 105 and 106 adapted to scan through slot 90, a film strip 107 having a pair of scanning tracks 108 and 109 thereon, as indicated in Fig. 6. Said photo electric cell housing 99 will have a dividing plate 110 forming a vertical division between said tracks 108 and 109 and will contain therein a photo electric cell 112 and 113 at either side of said dividing plate to be respectively actuated by the light beams 106a and 105a from the housings 106 and 105.

Thus it is seen that with a slight modification applicant's device is adapted to be used to actuate two different work pieces, such as two different slide changers which may be operating simultaneously, such as in different rooms. Whatever relationship the operator desires may be arranged between the scanning tracks 108 and 109 in accordance with whatever way they are respectively formed.

Thus it is seen that the applicant has provided a variable interval timing device of very simple construction which may be adapted to operate at whatever intervals it may be desired as predetermined on a prepared film strip. Applicant's device is adapted for efficient foolproof usage and for adaptation for operation of more than one work piece at a time if it is so desired.

It will of course be understood that various changes may be made in the form, details, arrangement and proportions of the parts, without departing from the scope of applicant's invention, which, generally stated, consists in a device capable of carrying out the objects above set forth, in the parts and combinations of parts disclosed and defined in the appended claims.

What is claimed is:

1. A variable interval timing device having in combination, a light sensitive actuating member, a light impervious film strip having spaced light conductive areas therein and having spaced perforations along the edges thereof, means for supporting said film strip, means having portions disposable through said perforations to engage said film strip, means for urging said means in a direction to advance said film strip, means for moving said second means into periodic engagement with said film strip, a light source projecting a beam of light, means for oscillating said light source and beam to scan said film strip and actuate said light sensitive member, and means for actuating said third means and said last mentioned means.

2. A variable interval timing device having in combination, a light sensitive actuating member, a light impervious film strip having spaced light conductive areas therein and having spaced perforations along the edges thereof, means for supporting said film strip, an elongated plate member having a pair of spaced upstanding prongs adapted to be disposed through pairs of said perforations in said film strip, a shaft disposed through said plate member and having a collar thereon for supporting the same, said plate member being movable in a plane at right angles to said shaft, means for periodically moving said plate member in an opposite direction and into engagement with said film strip, a light source projecting a beam of light, means for operating said light source to scan said film strip and actuate said light sensitive member, and means for actuating said third means and said last mentioned means simultaneously.

3. A variable interval timing device having in combination, a photo electric cell, a light impervious film strip having spaced light conductive areas therein and having spaced perforations along the edges thereof, means for supporting said film strip, a plate member having spaced upstanding prongs for engagement with said perforations in said film strip, a cam adapted for releasing engagement with said plate member to move the same upwardly and rearwardly of the direction of advance of said film strip for engagement with said film strip, means for constantly urging said plate member forwardly in a direction to advance said film strip, said plate member normally being disengaged from said film strip, a light source projecting a beam of light, means for oscillating said light source and beam of light to scan said film strip and actuate said photo electric cell, and means for actuating said cam means and said last mentioned means simultaneously.

4. A variable interval timing device having in combination, a photo electric cell, a light impervious film strip having spaced light conductive areas therein and having spaced perforations along the edges thereof, means for supporting said film strip, an elongated plate member having a portion thereof adapted for engagement with said film strip, means for supporting said plate member, means for urging said plate member in a forward direction to advance said film strip and to urge said plate member out of engagement with said film strip, a cam having a tangentially and upwardly inclined portion thereon for releasing engagement with said plate member, said plate member having a depending portion adapted to be engaged by said portion of said cam to be moved rearwardly and upwardly thereby and to be released thereby to be urged forwardly by said urging means for a certain distance while holding said plate member in engagement with said film strip to advance said film strip, means for supporting and rotating said cam, a light source projecting a beam of light, means for oscillating said light source and beam of light to scan said film and actuate said photo electric cell, and means for actuating said cam and said last mentioned means.

5. A variable interval timing device having in combination, a photo electric cell, a light impervious film strip having spaced light conductive areas therein and having spaced perforations along the edges thereof, means for supporting said film strip, a plate member having upstanding prongs adapted to engage said film strip through the perforations thereof, means for movably supporting said plate member, means for moving said plate member forwardly in a direction to advance said film strip, a cam, a shaft for supporting said cam, a second cam on said shaft, a light housing projecting a beam of light to actuate said photo electric cell, a plate member for supporting said light housing, said plate member being operationally connected to said first mentioned means, a cam follower mounted on said plate member, said second mentioned cam adapted to engage said cam follower and to move said follower and said plate connected thereto in one direction, means for urging said last mentioned plate in a reverse direction whereby said light source and beam of light is oscillated and adapted to scan said film strip, means for rotating said shaft, said first mentioned cam moving said plate member upwardly and rearwardly for a certain distance to come into engagement with said film strip, said plate member being normally out of engagement with said film strip, said cam being adapted to release said plate member to permit the same to be urged forwardly for a certain distance while in engagement with said film strip to advance said film strip said certain distance and said cam being adapted to subsequently permit said plate member to become disengaged from said film strip.

6. A variable interval timing device having in combination, a photo electric cell, a light impervious film strip having spaced light conductive areas therein and having spaced perforations along the edges thereof, means for supporting said film strip, means movable longitudinally of said film strip and adapted to engage said film strip, means for supporting said last mentioned means, means for normally urging said second means in a direction to advance said film strip in a plane out of the plane of said film strip, means for moving said second means a certain distance in a direction opposite said first direction and into engagement with said film strip, said last mentioned means being adapted to permit said second means to be moved in a direction to advance said film strip said certain distance while in engagement with said film strip and then permit said second means to become disengaged from said film strip by said third mentioned means, a light housing and light beam operationally associated with said second means, and means for actuating said third means and for oscillating said light housing and light beam to scan said film strip and actuate said photo electric cell.

7. The structure set forth in claim 6, said second means comprising a plate member having transversely spaced upstanding prongs to be disposed through said perforations in said film strip.

8. The structure set for in claim 6, said second means comprising a plate member having prongs upstanding therefrom to be disposed through perforations of said film strip and having a depending portion having a forwardly extending portion and a downwardly extending portion, each of said last two mentioned portions being of reduced dimension and said fourth means comprising a cam having a peripheral tangentially extending projection to engage said downwardly extending portion, said projection having an upwardly inclined surface to engage said forwardly extending portion whereby said plate member is moved upwardly and in a direction rearwardly of the advance of said film strip to engage said film strip, said projection moving out of engagement with said downwardly extending portion to permit said plate member to be urged forwardly a certain distance to advance said film strip and said inclined surface moving out of engagement with said forwardly extending portion to permit said plate member to be urged downwardly out of engagement with said film strip.

9. A variable interval timing device having in combination, a photo electric cell, a light impervious film strip having spaced light conductive areas therein and having spaced perforations along the edges thereof, means for supporting said film strip, means having portions disposable through said perforations to engage said film strip, means for urging said last mentioned means in a direction to advance said film strip, means for urging said second means into periodic engagement with said film strip, a plurality of light sources respectively adapted to project beams of light onto said film strip, means for oscillating said light sources for having said beams of light scan said film strip whereby each of said beams of light is adapted to pass over certain of said light conductive areas to actuate said photo electric cell.

10. The structure set forth in claim 9, a vertical dividing member extending centrally longitudinally of said film strip having certain of said light conductive areas pass along either side thereof, said light sources projecting their respective beams of light at either side of said dividing member and respectively passing through said light conductive areas at either side thereof.

References Cited in the file of this patent

UNITED STATES PATENTS

| | | |
|---|---|---|
| 2,565,266 | Potts | Aug. 21, 1951 |
| 2,586,711 | Potts | Feb. 19, 1952 |
| 2,721,229 | Fitch | Oct. 18, 1955 |
| 2,724,014 | Edgar | Nov. 15, 1955 |